United States Patent
Kubota et al.

(10) Patent No.: US 9,324,295 B2
(45) Date of Patent: Apr. 26, 2016

(54) DISPLAY DEVICE AND METHOD OF CONTROLLING DISPLAY DEVICE

(71) Applicant: SEIKO EPSON CORPORATION, Tokyo (JP)

(72) Inventors: Mitsuru Kubota, Matsumoto (JP); Kazuyoshi Kitabayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 37 days.

(21) Appl. No.: 14/016,630

(22) Filed: Sep. 3, 2013

(65) Prior Publication Data

US 2014/0071099 A1 Mar. 13, 2014

(30) Foreign Application Priority Data

Sep. 10, 2012 (JP) ................. 2012-198167

(51) Int. Cl.
- *G06F 3/14* (2006.01)
- *G09G 5/00* (2006.01)
- *G06F 3/0354* (2013.01)
- *G09G 3/00* (2006.01)

(52) U.S. Cl.
CPC .............. *G09G 5/006* (2013.01); *G06F 3/0354* (2013.01); *G06F 3/1423* (2013.01); *G09G 3/002* (2013.01); *G09G 2300/026* (2013.01)

(58) Field of Classification Search
CPC ........... G06F 3/1454; G06F 3/14; G06F 5/14; G09G 5/005; G09G 2340/0407; H04N 9/12
USPC ......................................................... 345/158
See application file for complete search history.

(56) References Cited

U.S. PATENT DOCUMENTS

| | | | |
|---|---|---|---|
| 6,501,463 B1 * | 12/2002 | Dahley | G01L 1/205 345/156 |
| 7,551,175 B2 | 6/2009 | Sakanishi et al. | |
| 2001/0010514 A1 | 8/2001 | Ishino | |
| 2003/0020757 A1 * | 1/2003 | Aratani et al. | 345/790 |
| 2005/0235228 A1 * | 10/2005 | Hashimoto et al. | 715/856 |
| 2007/0257927 A1 * | 11/2007 | Sakanishi et al. | 345/1.2 |
| 2010/0064260 A1 * | 3/2010 | Amano | G06F 3/14 715/859 |
| 2011/0234632 A1 | 9/2011 | Kubota et al. | |

FOREIGN PATENT DOCUMENTS

| | | |
|---|---|---|
| JP | A-2000-242427 | 9/2000 |
| JP | A-2001-325069 | 11/2001 |
| JP | A-2002-91642 | 3/2002 |
| JP | A-2006-85410 | 3/2006 |
| JP | A-2011-209345 | 10/2011 |
| WO | WO2005/088602 A1 | 9/2005 |

* cited by examiner

Primary Examiner — Kevin M Nguyen
(74) Attorney, Agent, or Firm — Oliff PLC (57) ABSTRACT

A projector includes a projection unit that displays an image on a screen, a control unit that allows the projection unit to display a plurality of images based on image data input from a plurality of PCs, a location detection unit that detects an operation location by a pointing tool, an output control unit that selects the PC based on the operation location detected by the location detection unit and a display location of the image on the screen, and an output switching unit that outputs coordinates of the operation location to the PC selected by the output control unit.

10 Claims, 6 Drawing Sheets

DISPLAY DEVICE AND METHOD OF CONTROLLING DISPLAY DEVICE

The entire disclosure of Japanese Patent Application No. 2012-198167, filed Sep. 10, 2012 is expressly incorporated by reference herein.

BACKGROUND

1. Technical Field

The present invention relates to a display device that displays an image and a method of controlling the display device.

2. Related Art

In related art, a device that, when an operation of pointing a location is performed with respect to a display surface with an image displayed thereon, detects the pointed location and operates has been known (for example, Patent Document 1 (JP-A-2000-242427)). A device described in Patent Document 1 displays an image input from a personal computer on a screen, detects a pointed location of a pointer on the screen, and, when a location of a symbol placed on the screen is pointed, executes an operation in response to the symbol.

Further, in related art, a projector that displays images input from a plurality of devices has been known (for example, Patent Document 2 (JP-A-2011-209345)). In a configuration of Patent Document 2, a personal computer for inputting images inputs information showing a location of a cursor to a projector and the projector displays the cursor based on the information.

In the configuration of Patent Document 1, the device that detects the pointed location of the pointer executes the operation in response to the pointed location, but the personal computer connected to the device is not able to perform an operation in response to the pointed location. Accordingly, it has been impossible to perform processing in response to the pointed location with respect to the image itself input from the personal computer.

Further, in the configuration of Patent Document 2, the projector displays the cursor based on the information input from the personal computer, but the projector does not output location information to the personal computer.

Therefore, in the case where the device that displays the input image detects the pointed location, processing on the input image itself based on the pointed location is not performed.

SUMMARY

An advantage of some aspects of the invention is, in a configuration in which an input image is displayed by a display device, to perform processing on the input image in response to an operation with respect to a displayed image.

An aspect of the invention is directed to a display device including a display unit that displays an image on a display surface, a display control unit that allows the display unit to display a plurality of images based on image data input from a plurality of image supply devices, a detection unit that detects an operation location of an operation by a pointing tool with respect to the display surface, an output control unit that selects the image supply device based on the operation location detected by the detection unit and a display location of the image on the display surface, and an output unit that outputs the operation location to the image supply device selected by the output control unit.

According to the aspect of the invention, when the operation with respect to the display surface on which the plurality of images are displayed is performed, the operation location is output to the image supply device that inputs the image. Thereby, for example, in the image supply device, processing of changing image data in response to the operation or the like may be performed.

Another aspect of the invention is directed to the display device according to the aspect of the invention, wherein the output control unit specifies an image superimposed on the operation location detected by the detection unit on the display surface and selects the image supply device corresponding to the specified image.

According to this aspect of the invention, when the operation is performed in the location superimposed on the displayed image, the information showing the operation location is output to the image supply device that inputs the data of the image, and thereby, the image supply device may process the image corresponding to the operation location. Therefore, various operations may be performed in response to the operation with respect to the display surface, and the operability may be improved.

Still another aspect of the invention is directed to the display device according to the aspect of the invention, wherein the display control unit allows the display unit to display an operation image with the plurality of images, and the output control unit selects all of the image supply devices corresponding to the images displayed by the display unit when the operation location detected by the detection unit is superimposed on the operation image on the display surface.

According to this aspect of the invention, the plurality of images are displayed and the operation image is displayed and, if the operation corresponding to the operation image is performed, the information showing the operation location is output to all image supply devices, and thereby, a wider variety of operations including changing of all images, for example, may be performed using the operation image.

Yet another aspect of the invention is directed to the display device according to the aspect of the invention, wherein the output unit outputs the operation location detected by the detection unit as coordinates with reference to the image input by the image supply device selected by the output control unit.

According to this aspect of the invention, the coordinates with reference to the image corresponding to the image supply device are output to the image supply device, and thereby, the operation location may be promptly specified in the image supply device and various processing including changing of the image based on the operation location may be executed more promptly.

Still yet another aspect of the invention is directed to the display device according to the aspect of the invention, wherein the display control unit selects at least a plurality of image supply devices among the plurality of image supply devices, and allows the display unit to display the plurality of images based on the image data input from the selected plurality of image supply devices.

According to this aspect of the invention, in the configuration in which image data is input from the plurality of image supply devices, the image supply device is selected, and thereby, a wide variety of displays may be performed without being limited by the number of image supply devices and the operation location may be suitably output to the image supply device corresponding to the operation location.

Further another aspect of the invention is directed to the display device according to the aspect of the invention, wherein the detection unit detects an operation status of the pointing tool with the operation location by the pointing tool, and the output control unit controls output of the operation location by the output unit and/or execution of other processing based on the operation status of the pointing tool detected by the detection unit.

According to this aspect of the invention, the other processing than outputting of the operation location may be executed based on the operation status of the pointing tool, and further, the processing and the outputting of the operation location may be appropriately executed. Accordingly, a wider variety of operations may be executed in response to the operations and the operability may be improved.

Still further another aspect of the invention is directed to the display device according to the aspect of the invention, wherein the output control unit selects the image supply device based on the operation status of the pointing tool detected by the detection unit, and the output unit outputs information showing the operation status of the pointing tool detected by the detection unit to the image supply device selected by the output control unit.

According to this aspect of the invention, the information showing the operation status of the pointing tool is output to the image supply device selected based on the operation status of the pointing tool, and thereby, in the image supply device, for example, processing including changing of the image in response to the operation status may be executed.

Yet further another aspect of the invention is directed to a method of controlling a display device including a display unit that displays an image on a display surface. The method includes selecting at least a plurality of image supply devices among a plurality of image supply devices, displaying a plurality of images based on image data input from each of the image supply devices, detecting an operation location of an operation by a pointing tool with respect to the display surface, selecting the image supply device as an output destination of the operation location based on the detected operation location and a display location of the image on the display surface, and outputting the operation location to the selected image supply device.

According to this aspect of the invention, when the operation is performed with respect to the display surface with the plurality of images displayed, the operation location is output to the image supply device that inputs the image. Thereby, for example, in the image supply device, processing including changing of image data in response to the operation may be performed.

According to the aspects of the invention, processing including changing of image data may be performed in response to the operation with respect to the display surface.

BRIEF DESCRIPTION OF THE DRAWINGS

The invention will be described with reference to the accompanying drawings, wherein like numbers reference like elements.

FIGS. 4A and 4B are explanatory diagrams showing examples of operations of the projection system.

FIGS. 5A to 5C are explanatory diagrams showing other examples of operations of the projection system.

DESCRIPTION OF EXEMPLARY EMBODIMENTS

As below, an embodiment to which the invention is applied will be explained with reference to the drawings.

Figure 1:
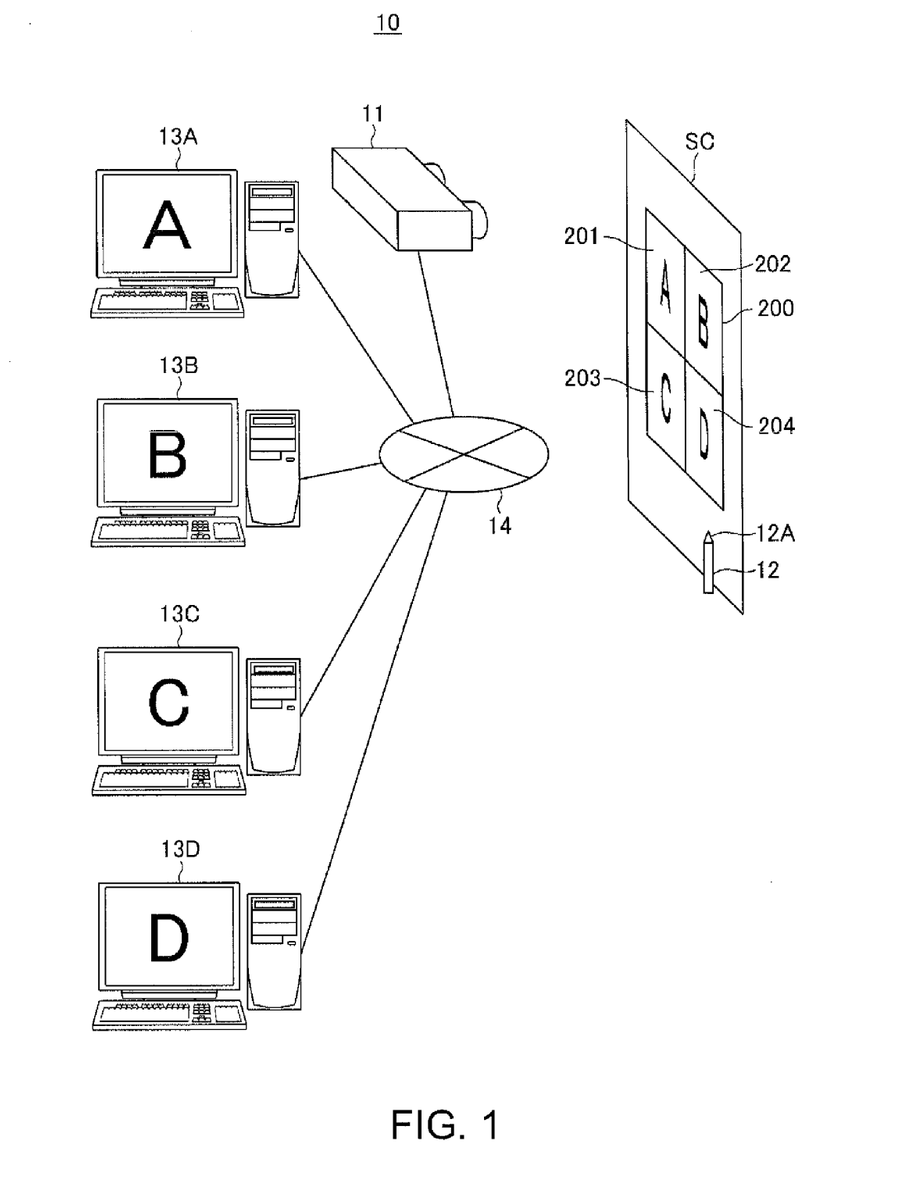
FIG. 1 shows a configuration of a projection system according to an embodiment of the invention.

FIG. 1 shows a configuration of a projection system 1 using a projector 11 according to the embodiment. To the projector 11 as a display device, a plurality of PCs (personal computers) 13 as image supply devices are connected. In the embodiment, a configuration in which four PCs 13A to 13D are connected to the projector 11 via a network 14 will be explained, however, the number of PCs 13 is arbitrary. Further, the network 14 is formed by wired communication lines including LAN cables, for example, or wireless communication lines, and the projector 11 and the respective devices of the PCs 13A to 13D may mutually transmit and receive various data via the network 14.

The PCs 13A to 13D respectively supply image data to the projector 11 via the network 14, and the projector 11 projects images based on the image data input from the PCs 13A to 13D on a screen SC. The screen SC is a flat plate or a curtain attached to a wall surface, a floor surface, a ceiling surface, or the like, and the wall surface itself may be used as the screen SC.

For example, as shown in FIG. 1, when image data is input from all of the four PCs 13A to 13D, the projector 11 may split a projection image 200 projected on the screen SC into four windows. On the four-split screen, the projection image 200 is split into four areas 201, 202, 203, 204, and images based on the image data output by the PCs 13A to 13D are respectively projected in the respective areas 201 to 204. The correspondences between the respective areas 201, 202, 203, 204 of the projection image 200 and the four PCs 13A to 13D when the projector 11 projects the four-split screen are set in advance.

Further, the projector 11 may change the projection status not only to the four-split screen but also to two-split screen or single screen. In the case of projection of the two-split screen, the projector 11 selects two PCs 13 among the PCs 13A to 13D and projects images based on image data input from the two PCs 13. Further, in the single screen display, i.e., in the normal projection status, the projector 11 projects an image based on image data output from one PC 13 selected from the PCs 13A to 13D on the entire projection image 200.

In the projection system 1, a location pointing operation may be performed using an pointing tool 12 on the screen SC. The pointing tool 12 is an operation device operated by the user with it in hand, and a pen-shaped pointing tool 12 is taken as an example in the embodiment. The projector 11 has a function of detecting the location of a tip end 12A of the pointing tool 12, and the user holds the pointing tool 12 in hand and performs an operation of pointing a desired location with the tip end 12A.

Further, in the projection system 1, a pressing force when the tip end 12A is pressed against the screen SC may be detected. Accordingly, the user may control the projection system 1 by the operation of pressing the pointing tool 12 held in hand against the screen SC. The function will be described later.

Figure 2:
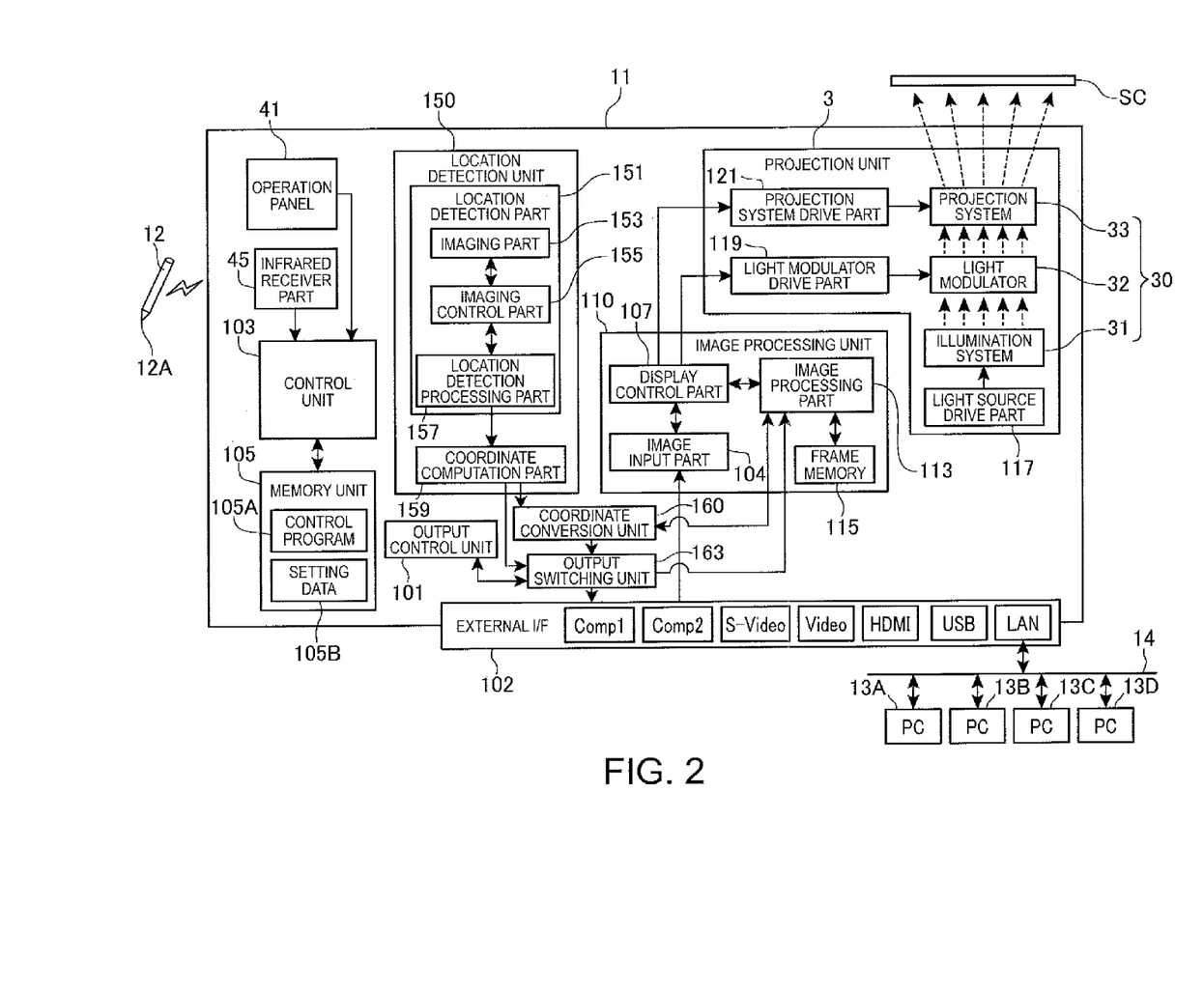
FIG. 2 is a functional block diagram of a projector.

FIG. 2 is a block diagram showing a functional configuration of the projector 11.

The projector 11 includes an external interface (I/F) 102 connected to an external device. As shown in FIG. 2, the external interface 102 has a Comp interface, an S-Video interface, a Video interface, an HDMI (registered trademark) interface, a USB interface, and a LAN interface for connection to video output terminals of a computer, and the network 14 is connected to the LAN interface in the embodiment. The external interface 102 may include a DisplayPort interface. To the projector 11, a DVD reproducer and a television tuner may be connected as image supply devices, and a portable terminal such as a portable media player, a cellular phone, or a smartphone may be connected. Further, a wireless communication interface including wireless LAN, Bluetooth (registered trademark), and UWB may be provided in the external interface 102 to enable execution of wireless communication between the projector 11 and the PCs 13A to 13D.

The projector 11 includes an image processing unit 110 that executes image processing of input image data input from the external interface 102, a projection unit 3 (display means) that projects an image on the screen SC according to the control by the image processing unit 110, a location detection unit 150 (detection means) that detects a pointed location of the pointing tool 12, a coordinate conversion unit 160 that converts coordinates of the pointed location detected by the location detection unit 150, an output switching unit 163 (output means) that outputs the coordinates converted by the coordinate conversion unit 160 to the PC 13 or the image processing unit 110, an output control unit 101 that allows the output switching unit 163 to switch the output destination to which the coordinates are output, and a control unit 103 that controls the respective units.

The control unit 103 (display control means) includes a CPU, a nonvolatile memory, a RAM, etc. (not shown), and reads out and executes a control program 105A stored in a memory unit 105 connected to the control unit 103 to control the respective units of the projector 11. The memory unit 105 includes a magnetic, optical recording device or a semiconductor memory element, and stores data including various programs including the control program 105A and various setting values.

To the control unit 103, an operation panel 41 having various switches and indicator lamps and an infrared receiver part 45 that receives infrared signals transmitted by a remote (not shown) are connected. The control unit 103 controls the respective units of the projector 11 based on operations of the switches on the operation panel 41 and operation signals of the remote (not shown) received by the infrared receiver part 45. Further, when receiving control data via the external interface 102 from the PCs 13A to 13D, the control unit 103 may control the projector 11 based on the control data. That is, the operation of the projector 11 may be controlled by the PCs 13A to 13D.

The projection unit 3 includes a projection part 30 (projection means) having an illumination system 31, a light modulator 32, and a projection system 33, a light source drive part 117 that drives the projection part 30, a light modulator drive part 119, and a projection system drive part 121. The illumination system 31 has a light source including a xenon lamp, an ultrahigh pressure mercury lamp, an LED (Light Emitting Diode), and a laser. The illumination system 31 may have a reflector and an auxiliary reflector that guide light emitted by the light source to the light modulator 32, and may have a lens group (not shown) for improvement of optical characteristics of the projection light, a polarizer, a dimmer element that reduces the amount of light emitted by the light source in a path reaching the light modulator 32, or the like.

The light modulator 32 has a modulation region for modulation of incident light, and receives signals from an image processing system, which will be described later, and modulates the light from the illumination system 31. In the embodiment, the case where the light modulator 32 is formed using a transmissive liquid crystal panel will be explained as an example. In the configuration, the light modulator 32 includes three liquid crystal panels corresponding to three primary colors of RGB for color projection. The light from the illumination system 31 is separated into three color lights of RGB, and the respective color lights enter the respective corresponding liquid crystal panels. The color lights modulated through the respective liquid crystal panels are combined by a combining system including a cross dichroic prism, and output to the projection system 33.

The projection system 33 includes a zoom lens for enlargement and reduction and adjustment of focal points of the images to be projected, a zoom adjustment motor that adjusts the degree of zooming, a focus adjustment motor for focus adjustment, etc.

The light source drive part 117 drives the light source of the illumination system 31 according to the control by the control unit 103. Further, the light modulator drive part 119 drives the light modulator 32 and modulates the light emitted by the illumination system 31 based on the image data output by the image processing unit 110. In the embodiment, the light modulator drive part 119 draws images on the three transmissive liquid crystal panels (not shown) of the light modulator 32 based on the image data. Furthermore, the projection system drive part 121 drives the respective motors of the projection system 33 according to the control by a display control part 107, and performs focus adjustment and zoom adjustment of the projection images projected on the screen SC.

The image processing unit 110 includes the display control part 107 that selects one or some pieces of the image data input to the external interface 102 according to the control by the control unit 103, an image input part 104 that performs processing including A (analog)/D (digital) conversion on the image data selected by the display control part 107, a frame memory 115, and an image processing part 113 that develops the image projected by the projection part 30 on the frame memory 115 based on the image data processed by the image input part 104.

The display control part 107 identifies the image supply devices (image sources) that input image data to the external interface 102 and the interfaces of the external interface 102 to which the respective image supply devices are connected. The display control part 107 determines which of the single screen, the two-split screen, and the four-split screen the projection status of the projector 11 is, and selects the image supply devices in the number corresponding to the projection status. For example, if the projection status of the projector 11 is set to the four-split screen, the display control part 107 selects the four image supply devices and allows the image input part 104 to process the image data input from the selected four image supply devices.

The display control part 107 distinguishes formats (frame rate, resolution, compression state) of the image data processed by the image input part 104 or the like, determines necessary processing for display of the display image on the light modulator 32, and executes the processing by controlling the image processing part 113. The processing performed by the image processing part 113 includes various conversion processing such as interlace/progressive conversion and resolution conversion and various image processing such as keystone correction, color compensation corresponding to color modes, enlargement/reduction processing of images, for example.

Further, the image processing part 113 computes image location information from information including resolution and an aspect ratio of image data being displayed and a display size on the liquid crystal display panel of the light modulator 32, and outputs the image location information to the coordinate conversion unit 160. The image location information is information showing the projection location of the display image in the projection area in which the projector 11 can perform projection on the screen SC. The projection area refers to the maximum area in which the projector 11 can perform projection on the screen SC and, for example, an area on the screen SC corresponding to the entire area usually used in the liquid crystal panel of the light modulator 32. In the case where the keystone correction is performed or the case where the aspect ratios and resolution are not equal between the liquid crystal panel of the light modulator 32 and the image to be projected, the area in which the image is actually drawn on the liquid crystal panel is apart of the area in which drawing may be performed. Accordingly, the image processing part 113 obtains image location information showing a location relationship between the area in which an image may be drawn on the liquid crystal panel of the light modulator 32 and the area in which an image is actually drawn.

The control unit 103 is connected to the external interface 102, and has a function of distinguishing the image supply device that may input the image data. The control unit 103 identifies the types of interfaces to which the respective image supply devices are connected in the external interface 102, the types of the input images input from the respective image supply devices, etc., and distinguishes the types, the model names, etc. of the respective image supply devices.

The control unit 103 selects one or more of the image supply devices connected to the external interface 102, and allows the image processing unit 110 to process the image data input from the selected image supply device. Specifically, the control unit 103 may control the external interface 102 to input only the image data input from the selected image supply device to the image input part 104, or the control unit 103 may control the image processing unit 110 to process only the image data input from the selected image supply device.

As shown in FIG. 1, the projector 11 has the so-called multi-window display function of displaying a plurality of input images in juxtaposition at the same time on the screen SC. The control unit 103 splits the area in which images may be displayed into a plurality of areas, and displays the plurality of input images input from the plurality of image supply devices in juxtaposition. In the case of the multi-window display, the control unit 103 selects the image supply device among the plurality of image supply devices connected to the external interface 102 within the upper limit number that may be displayed at the same time in the multi-window display. For example, as shown in FIG. 1, in the case where the screen is split into four and four images are displayed, the control unit 103 selects the four image supply devices among the image supply devices connected to the external interface 102.

Further, in the case where the image data is stored in the memory unit 105, if reproduction display of the image data stored in the memory unit 105 is commanded by the operation detected by the operation panel 41 or the infrared receiver part 45, the control unit 103 may select the projector 11 itself as the image supply device. Furthermore, the projector 11 may use an external memory device such as a USE flash memory connected to the USE interface of the external interface 102 as the image supply device, and perform slide-show display of sequentially displaying a plurality of images that may be supplied from the external memory device.

The projector 11 has the location detection unit 150 (detection means) that detects the coordinates of the pointed location pointed by the pointing tool 12 on the screen SC. The location detection unit 150 includes an imaging part 153 that images the screen SC, an imaging control part 155 that controls the imaging part 153, a location detection part 151 having a location detection processing part 157 that detects the pointed location of the pointing tool 12 based on the taken image of the imaging part 153, and a coordinate computation part 159 that computes the coordinates of the pointed location detected by the location detection part 151.

For example, the imaging part 153 is a digital camera that images an angle of view containing the maximum range in which the projection part 30 may project an image on the screen SC, and executes imaging according to the control by the imaging control part 155 and outputs taken image data. The imaging control part 155 controls the imaging part 153 to execute imaging according to the control by the control unit 103. In the case where the imaging part 153 has mechanisms of adjustment of zoom factor, focus, and aperture on imaging, the imaging control part 155 controls the mechanisms and executes imaging under a preset condition. After imaging, the imaging control part 155 acquires the taken image data output by the imaging part 153 and outputs the data to the location detection processing part 157.

Note that the imaging part 153 may have a configuration adapted to image visible light or a configuration adapted to image invisible light (infrared light or the like) In the case where the imaging part 153 is able to image invisible light, a configuration in which the pointing tool 12 outputs invisible light and the imaging part 153 images the invisible light output from the pointing tool 12, a configuration in which the pointing tool 12 has a reflection part that may reflect invisible light, invisible light is projected from the projector 11 on the screen SC through the control by the control unit 103, the invisible light reflected by the reflection part of the pointing tool 12 is imaged by the imaging part 153, or the like may be employed.

The location detection processing part 157 analyzes the taken image data input from the imaging control part 155, extracts an edge of the projection image 200 on the screen SC and an image of the pointing tool 12 from the taken image data, and specifies the pointed location by the pointing tool 12. As the pointed location of the pointing tool 12, the location of the tip end 12A may be specified.

The coordinate computation part 159 performs computation of the coordinates based on the location of the pointing tool 12 specified by the location detection processing part 157. The coordinates computed by the coordinate computation part 159 are coordinates in a coordinate system with reference to the entire projection image 200 projected by the projector 11 on the screen SC. For example, an orthogonal coordinate system with the origin on the upper left corner is set in the rectangular projection image 200 after distortion correction such as trapezoidal distortion correction, the coordinate computation part 159 computes the coordinates of the pointed location of the pointing tool 12 in the coordinate system. The coordinate computation part 159 outputs coordinate data (coordinate information) representing the computed coordinates to the coordinate conversion unit 160. In the following explanation, the coordinate data computed by the coordinate computation part 159 and output from the location detection unit 150 will be referred to as "first coordinate information".

The coordinate conversion unit 160 converts the first coordinate information output by the location detection unit 150 into second coordinate information representing coordinates in the image data input by the PC 13 to the projector 11. That is, the coordinate conversion unit 160 converts the first coordinate information representing the coordinates of the pointed location of the pointing tool 12 on the screen SC into the second coordinate information representing the coordinates in the input image data based on the image location information output by the image processing part 113, and outputs the information to the output switching unit 163. Further, the coordinate conversion unit 160 may output the first coordinate information before conversion to the output switching unit 163.

In the case where the multi-window display function is executed, in the projection image 200, input images input from the plurality of image supply devices are displayed in juxtaposition. In this case, the coordinate conversion unit 160 computes the coordinates of the pointed location with reference to the respective input images based on the locations of the respective input images arranged in the projection image 200 and the first coordinate information computed by the coordinate computation part 159. As shown in FIG. 1, in the case where four input images are arranged in the projection image 200, the coordinate conversion unit 160 acquires the information showing the locations of the respective input images in the projection image 200 with the image location information from the image processing unit 110 and performs conversion of the coordinates based on the information. In this case, the coordinate computation part 159 generates the second coordinate information with respect to each image supply device and outputs the information to the output switching unit 163.

Note that the control unit 103 executes calibration of detecting and correcting the correspondence between the coordinates on the screen SC and the coordinates on the taken image data as necessary.

The output control unit 101 (output control means) specifies an output destination corresponding to the coordinate information output by the coordinate conversion unit 160 to the output switching unit 163, and the output switching unit 163 switches the output destination of the coordinate information according to the control by the output control unit 101. As the output destination of the coordinate information, the respective image supply devices connected to the external interface 102 and the image processing unit 110 may be selected.

For example, when the first coordinate information is input from the coordinate conversion unit 160 to the output switching unit 163, the output control unit 101 designates the image processing unit 110 as the output destination. In this case, the display control part 107 executes processing of drawing curved lines and straight lines based on the first coordinate information and processing of drawing a menu bar 210 (FIG. 4A), which will be described later.

Further, for example, when the second coordinate information is input from the coordinate conversion unit 160 to the output switching unit 163, the output control unit 101 designates one of the PCs 13A to 13D as the output destination, and the output switching unit 163 outputs the second coordinate information to the designated output destination via the external interface 102. For example, when the coordinate conversion unit 160 outputs the second coordinate information showing the coordinates in the input image data of the PC 13A, the output control unit 101 designates the PC 13A as the output destination of the second coordinate information, and the output switching unit 163 outputs the second coordinate information to the PC 13A.

Here, the second coordinate information output by the output switching unit 163 to the external interface 102 has the same data format as that of coordinate data output by a pointing device such as a mouse, a trackball, a digitizer, or a pen tablet, for example.

The pointing tool 12 has a function of detecting the pressing force applied to the tip end 12A, and transmits information showing the detected pressing force as an infrared signal. The infrared signal transmitted by the pointing tool 12 is received by the infrared receiver part 45 of the projector 11, and the infrared receiver part 45 decodes and outputs the received infrared signal to the control unit 103. Accordingly, when the operation of pressing the tip end 12A against the screen SC by the user with the pointing tool 12 in hand, the control unit 103 may detect the operation. In the embodiment, the pen-shaped pointing tool 12 is employed, and the pressing force of the tip end 12A transmitted by the pointing tool 12 is referred to as "pen pressure".

Figure 3:
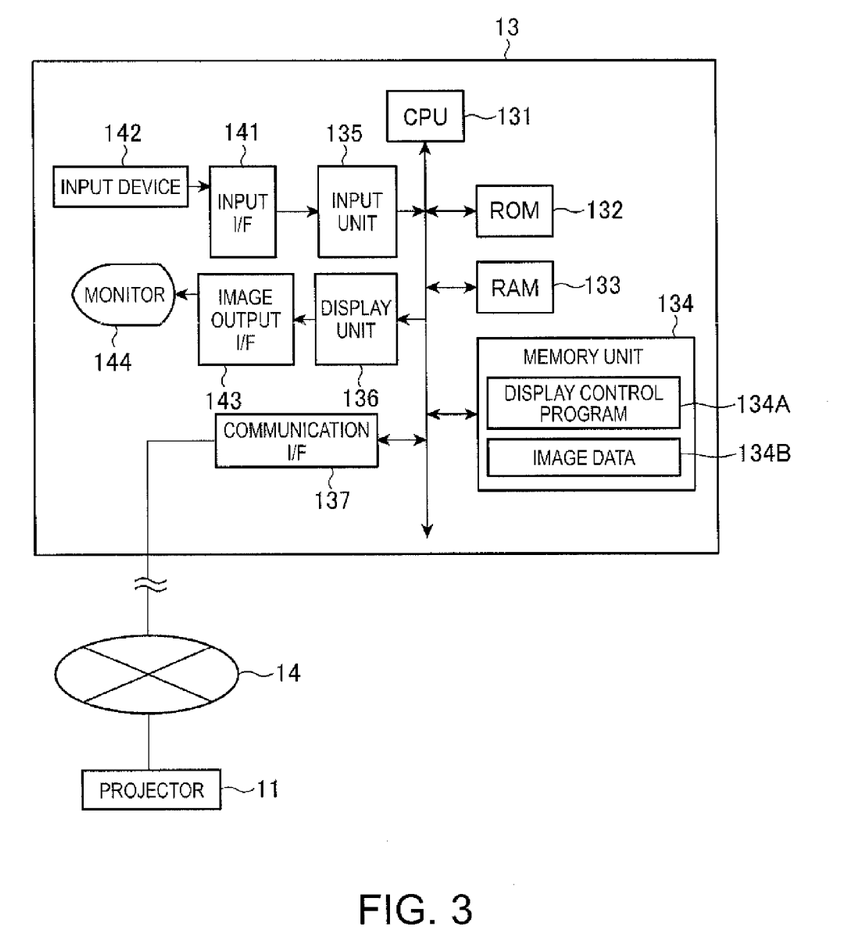
FIG. 3 is a functional block diagram of a personal computer.

FIG. 3 is a block diagram showing a functional configuration of the PC 13. All of the four PCs 13A to 13D exemplified in the embodiment have a common configuration. Accordingly, in the embodiment, the PCs 13A to 13D are collectively referred to as "PC 13" and the configuration of the PC 13 will be explained with reference to FIG. 3.

The PC 13 includes a CPU 131 that executes a control program to centrally control the respective units of the PC 13, a ROM 132 that stores a basic control program executed by the CPU 131 and stores data relating to the program, a RAM 133 that temporarily stores programs and data executed by the CPU 131, a memory unit 134 that stores the programs and data in a non-volatile manner, an input unit 135 that detects an input operation and outputs data and an operation signal showing the input content to the CPU 131, a display unit 136 that outputs display data for display of processing results by the CPU 131 etc., and a communication interface (I/F) 137 that transmits and receives data etc. between an external device and itself, and these respective units are mutually connected via a bus.

The input unit 135 has an input interface (I/F) 141 having a connector and a power supply circuit, and an input device 142 is connected to the input interface 141. The input interface 141 includes a general-purpose interface for input device such as a USB interface, for example, and the input device 142 is a keyboard or a pointing device such as a mouse or a digitizer, for example.

The display unit 136 has an image output interface (I/F) 143 including a connector for image data output etc., and a monitor 144 is connected to the image output interface 143. Further, in the case where the PC 13 and the projector 11 are connected using a cable for image data transmission (for example, an RGB cable), the cable is connected to the image output interface 143. For example, the image output interface 143 may include one or more VGA terminals that output analog image data, DVI interfaces, USB interfaces, and LAN interfaces that output digital image data, S-video terminals that output composite video signals of NTSC, PAL, and SECAM, RCA terminals that output composite video signals, D-terminals that output component video signals, HDMI (registered trademark) connectors compliant to HDMI standard, DisplayPort connectors, etc., and may have a function of transmitting image data via wireless communication.

The communication interface 137 is formed as a wired or wireless interface and connected to the network 14. The PC 13 transmits and receives image data and various control data between the projector 11 and itself via the communication interface 137.

The memory unit 134 has stored a display control program 134A executed by the CPU 131 and image data 134B output when the display control program 134A is executed. The CPU 131 executes the display control program 134A and executes processing of transmitting the image data 134B to the projector 11. In the processing, the CPU 131 displays the image data 134B on the monitor 144, and generates and transmits image data with predetermined display resolution from the communication interface 137. Note that the image data 134B may be image data obtained by capturing of the window displayed by the PC 13 on the monitor 149. In this case, the same window as the window being displayed on the monitor 144 is projected by the projector 11 on the screen SC.

Further, when receiving the second coordinate information detected by the projector 11 through the communication interface 137 during execution of the display control program 134A, the CPU 131 generates an image for display of a pointer, a figure, or the like on the location corresponding to the second coordinate information. The CPU 131 generates image data in which the generated image is superimposed on the image data 134B, and transmits the image data to the projector 11.

Furthermore, the display control program 134A is a program for projector control having a function of controlling the projector 11 to command execution of multi-window display and designate the area in which the input image from the PC 13 is displayed in the multi-window display. The display control program 134A is executed, and thereby, the PC 13 not only outputs the image to the projector 11 but also transmits and receives various control data. Accordingly, for example, the CPU 131 may generate an image in which a trajectory of the operation of the pointing tool 12 is drawn with a line based on the coordinate data input from the projector 11 to the input interface 141, and output the image to the projector 11.

Figure 4A:
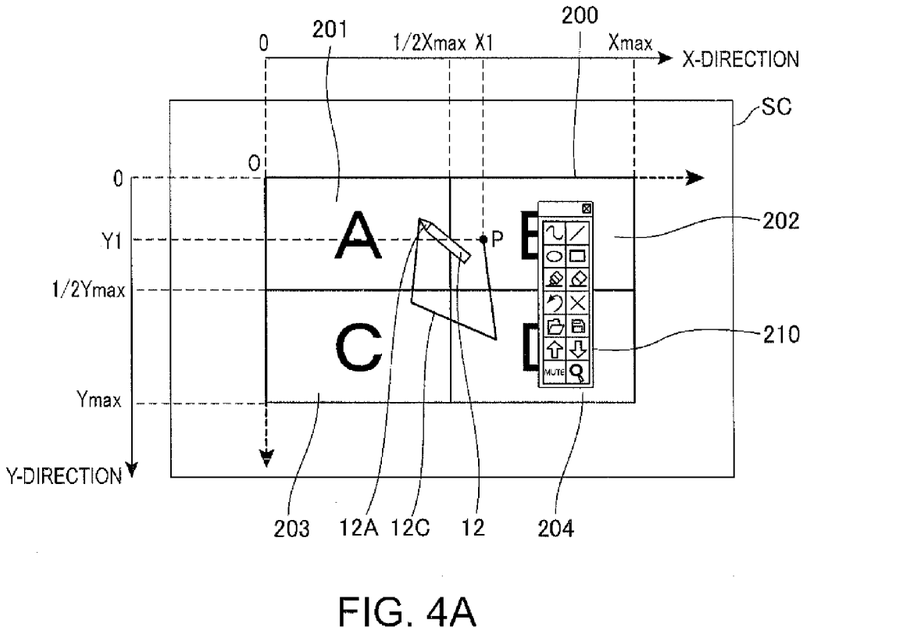
FIG. 4A shows an example of an operation by a pointing tool and FIG. 4B shows an example of an image output by a PC.
Figure 4B:
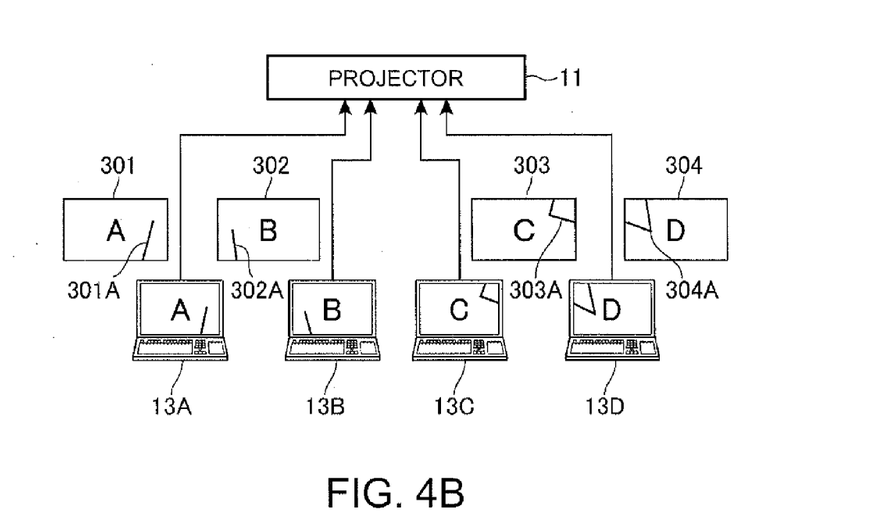

FIGS. 4A and 4B are explanatory diagrams showing examples of operations of the projection system 1, and FIG. 4A shows an example of the operation by the pointing tool 12 and FIG. 4A shows an example of the image output by the PC 13. In FIGS. 4A and 4B, the case where the projector 11 performs four-split multi-window display based on image data respectively transmitted by the four PCs 13A to 13D to the projector 11 is exemplified.

As shown in FIG. 4A, the projector 11 projects the projection image 200 split into four areas and images based on the image data respectively output by the PCs 13A to 13D are arranged in the respective areas 201, 202, 203, 204.

Further, the projection image 200 contains the menu bar 210 (operation image). The menu bar 210 is drawn by the image processing unit 110 of the projector 11 and superimposed and displayed on the images based on the input image data of the PCs 13A to 13D.

A plurality of buttons are provided in the menu bar 210, and functions to be executed by the projector 11 are assigned to the respective buttons. When a location superimposed on the button of the menu bar 210 is pointed by the pointing tool 12, the projector 11 executes the function assigned to the button superimposed on the pointed location. The buttons of the menu bar 210 include, for example, as buttons for commanding drawing functions, buttons for commanding drawing of figures (curved lines, straight lines, circles, ovals, rectangles, etc.), coloring of the drawn figures, partially deleting the drawn figures, re-executing processing, and deleting the entire drawn figures. Further, in the menu bar 210, as buttons for commanding file operations, buttons for commanding a function of opening an image data file, a function of saving a drawn figure or all images being projected including the figure as image data, a function of performing the above described slide show by sequentially changing and opening image data files, etc. may be provided. Furthermore, buttons to which an AV mute function of temporarily stopping image projection and a zoom function of enlarging and displaying a part of the projection image 200 may be provided.

In the example of the embodiment, as shown by arrows in FIG. 4A, an X-Y orthogonal coordinate system is set in the coordinate computation part 159. The location detection unit 150 detects the location pointed by the pointing tool 12 according to the coordinate system with the origin on the upper left corner of the projection image 200, and outputs first coordinate information showing the coordinates.

Here, when a figure drawing button of the menu bar 210 is operated by the operation of the pointing tool 12, the projector 11 starts the operation in a drawing mode. In the drawing mode, the projector 11 detects the pointed location of the pointing tool 12 and outputs second coordinate information showing the coordinates of the pointed location to the PCs 13A to 13D, and the PCs 13A to 13D draw straight lines and curved lines along the trajectory of the pointed location of the pointing tool 12 based on the second drawing information.

In the example of FIG. 4A, a drawn FIG. 12C is drawn along the trajectory of the pointing tool 12. The drawn FIG. 12C of the example includes straight lines passing through the respective areas 201 to 204 in the order of areas 202, 204, 203, 201.

The control unit 103 distinguishes to which area of the areas 201 to 204 the coordinates calculated by the coordinate computation part 159 (first coordinate information) belong, and allows the coordinate conversion unit 160 to execute conversion into coordinates in the distinguished area (second coordinate information). The output control unit 101 determines the PC 13 corresponding to the area distinguished by the control unit 103 among the PCs 13A to 13D as the output destination of the coordinates converted by the coordinate conversion unit 160, and allows the output switching unit 163 to output the destination. Thereby, the second coordinate information on the pointed location pointed by the pointing tool 12 in the area 201 is output to the PC 13A, and similarly, the second coordinate information on the areas 202 to 204 is respectively output to the PCs 13B to 13D.

For example, as shown in FIG. 4A, when the X-Y coordinate system with the origin at point O on the upper left corner of the projection image 200 is set, the coordinates (X,Y) in the projection image 200 satisfy $0 \leq X \leq Xmax$, $0 \leq Y \leq Ymax$. This area is split at $X=\frac{1}{2}Xmax$, $Y=\frac{1}{2}Ymax$ into the areas 201 to 204.

Here, the coordinates in the projection image 200 are normalized supposing that $Xmax=1$, $Ymax=1$, and the ranges of the areas 201 to 204 are expressed in the following expressions (1).

Area 201: $0 \leq X \leq 0.5$, $0 \leq Y \leq 0.5$

Area 202: $0.5 \leq X \leq 1$, $0 \leq Y \leq 0.5$

Area 203: $0 \leq X \leq 0.5$, $0.5 \leq Y \leq 1$

Area 204: $0.5 \leq X \leq 1$, $0.5 \leq Y \leq 1$ \hfill (1)

The location detection unit 150 detects pointed location P by the pointing tool 12 using the location detection processing part 157, and computes coordinates (X1,Y1) of the location P in the projection image 200 using the coordinate computation part 159. As an example, the normalized coordinates of the location P are (X1,Y1)=(0.6, 0.3).

The coordinate conversion unit 160 compares the coordinates (0.6, 0.3) computed by the coordinate computation part 159 with the ranges of the expressions (1), and thereby, distinguishes the location P in the area 202. Then, the coordinate conversion unit 160 computes normalized coordinates (X2, Y2) of the location P in the area 202 as expressed in the following expressions.

$$X2=(X1-0.5) \div (1-0.5)=0.2$$

$$Y2=(Y1-0) \div (0.5-0)=0.6 \quad (2)$$

Thus computed coordinates of the location P are coordinates with the origin on the upper left corner of the area 202 and coordinates of the location P (second coordinate information) in the image output by the PC 13B. The converted coordinates are output to the PC 13B.

In this manner, the coordinate computation part 159 computes the coordinates of the pointed location (operation location) of the pointing tool 12 as coordinates in the entire projection image 200, i.e., coordinates with the origin on the upper left corner of the projection image 200. Further, the coordinate conversion unit 160 computes coordinates with the origins on the upper left corners of the areas 201 to 204, i.e., coordinates with the origins on the upper left corners of image data output by the PCs 13A to 13D (in other words, coordinates with reference to images input by the PCs 13A to 13D to the projector 11) based on the coordinates computed by the coordinate computation part 159, and outputs the coordinates to the PCs 13A to 130.

Note that the above described operation is just an example, and setting configurations of the locations of the origins and the coordinate system are not limited to those. The coordinate computation part 159 may compute coordinates with the origin on the center of the projection image 200 as first coordinate information, and the coordinate conversion unit 160 may compute coordinates with the origins on the centers of the areas 201 to 204, i.e., centers of image data output by the PCs 13A to 13D.

The PCs 13A to 13D respectively draw straight lines based on the second coordinate information input from the projector 11, and output superimposition images obtained by superimposition of the drawn straight lines on the images being output to the projector 11 to the projector 11.

As shown in FIG. 4B, the PC 13A draws a straight line 301A on the output image 301 and outputs the straight line to the projector 11. Similarly, the PCs 13B to 13D draw straight lines 302A, 303A, 304A based on the second coordinate information input from the projector 11, and superimposes the straight lines on output images 302, 303, 304 being output to the projector 11.

In this manner, in the case where the location pointing operation by the pointing tool 12 is performed during multi-window display, the projector 11 detects the pointed location and obtains the coordinates in the projection image 200, distinguishes the image superimposed on the pointed location, and outputs the second coordinate information to the image supply device corresponding to the distinguished image. The PC 13 may easily perform drawing because the second coordinate information in the image being output to the projector 11 is input thereto.

When the coordinates of the pointed location are superimposed on a specific button of the menu bar 210, the output control unit 101 outputs the first coordinate information Or other control information to all of the PCs 13A to 13D. For example, when the pointed location of the pointing tool 12 is superimposed on the button for designating drawing colors of figures to be drawn in the menu bar 210, the control unit 103 controls the output control unit 101 to select all PCs 13A to 13D as output destinations. In this case, if the respective PCs 13A to 13D hold the coordinates of the display locations of the respective buttons of the menu bar 210 in the projection image 200 and control information on the functions of the respective buttons in advance, the respective PCs 13A to 13D may detect that the drawing colors have been designated and set the drawing colors for drawing of the figures. Alternatively, the control unit 103 may generate control information for designating the drawing colors for the figures based on the operation on the buttons, and allow the output switching unit 163 to output the information to all PCs 13A to 13D. In this case, the PCs 13A to 13D having no information on the display location of the menu bar 120 or the like may set the drawing colors of the figures in response to the operation of the pointing tool 12. The operation may also be applied not only to the setting of the drawing colors but also to setting of the types of figures to be drawn or the like, for example.

The projector 11 may perform a different operation based on the function of detecting the pen pressure of the pointing tool 12.

Figure 5A:
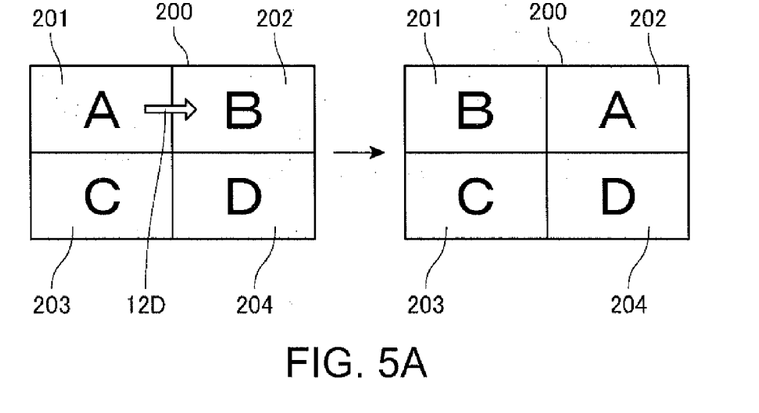
FIG. 5A shows an example of exchanging locations of images and FIGS. 5B and 5C show examples of changing split states of the screen.
Figure 5B:
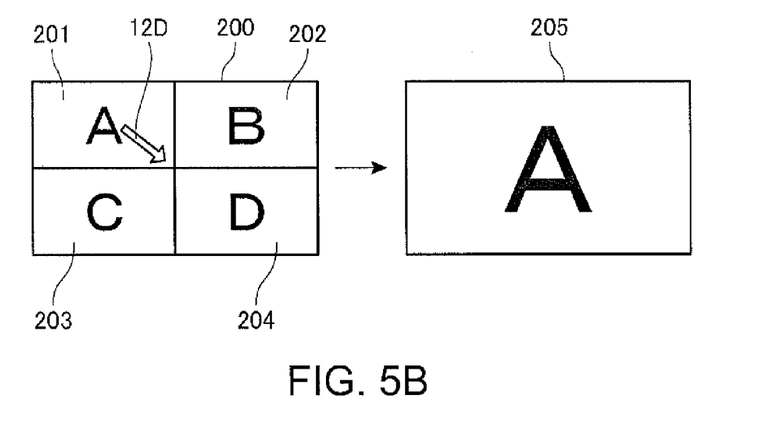
Figure 5C:
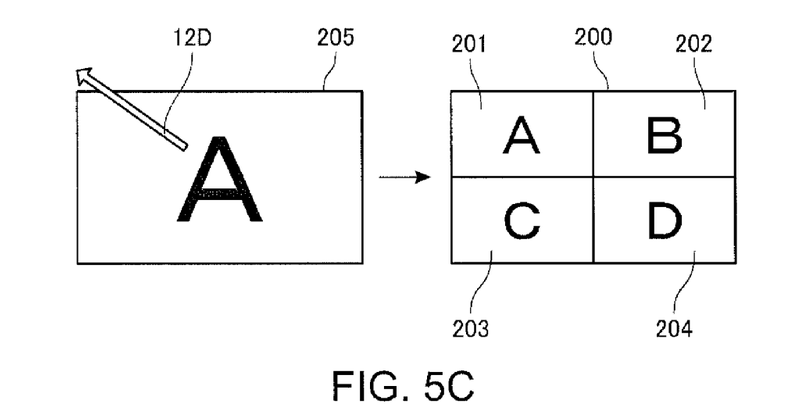

FIGS. 5A to 5C are explanatory diagrams showing other examples of operations of the projection system 1, and FIG. 5A shows an example of exchanging locations of images and FIGS. 5B and 5C show examples of changing split states of the screen. In FIGS. 5A to 5C, a trajectory 120 of the pointed location of the pointing tool 12 is shown by arrows.

FIG. 5A shows the example when the pointing tool 12 is operated across a plurality of areas. In this example, the pointing tool 12 is operated to draw the trajectory 12D with the tip end 12A pressed against the screen SC. The control unit 103 detects the pen pressure of the pointing tool 12 at a predetermined or higher level based on the infrared signal transmitted by the pointing tool 12. In this case, the control unit 103 controls the image processing unit 110 to perform processing of exchanging the images displayed in the respective areas superimposed on the trajectory 12D as shown in FIG. 5A, for example.

Further, in the case where, with the pen pressure of the pointing tool 12 remaining at the predetermined or higher level, the pointing tool 12 is operated to move within one area 201 as shown in FIG. 50, for example, the control unit 103 controls the image processing unit 110 to execute switching from the projection image 200 in multi-window display to a projection image 205 in single window display and displays the image displayed in the area 201 on the entire of the projection image 205.

Alternatively, in the case where, with the pen pressure of the pointing tool 12 remaining at the predetermined or higher level, the pointing tool 12 is operated to move from the inside to the outside of the projection image 205 as shown in FIG. 5C, for example, the control unit 103 controls the image processing unit 110 to execute switching from the projection image 205 in single window display to the projection image 200 in multi-window display.

In this manner, the pressure information transmitted by the pointing tool 12 is combined, and thereby, another operation may be executed without output of the coordinate information to the PC 13, too.

Figure 6:
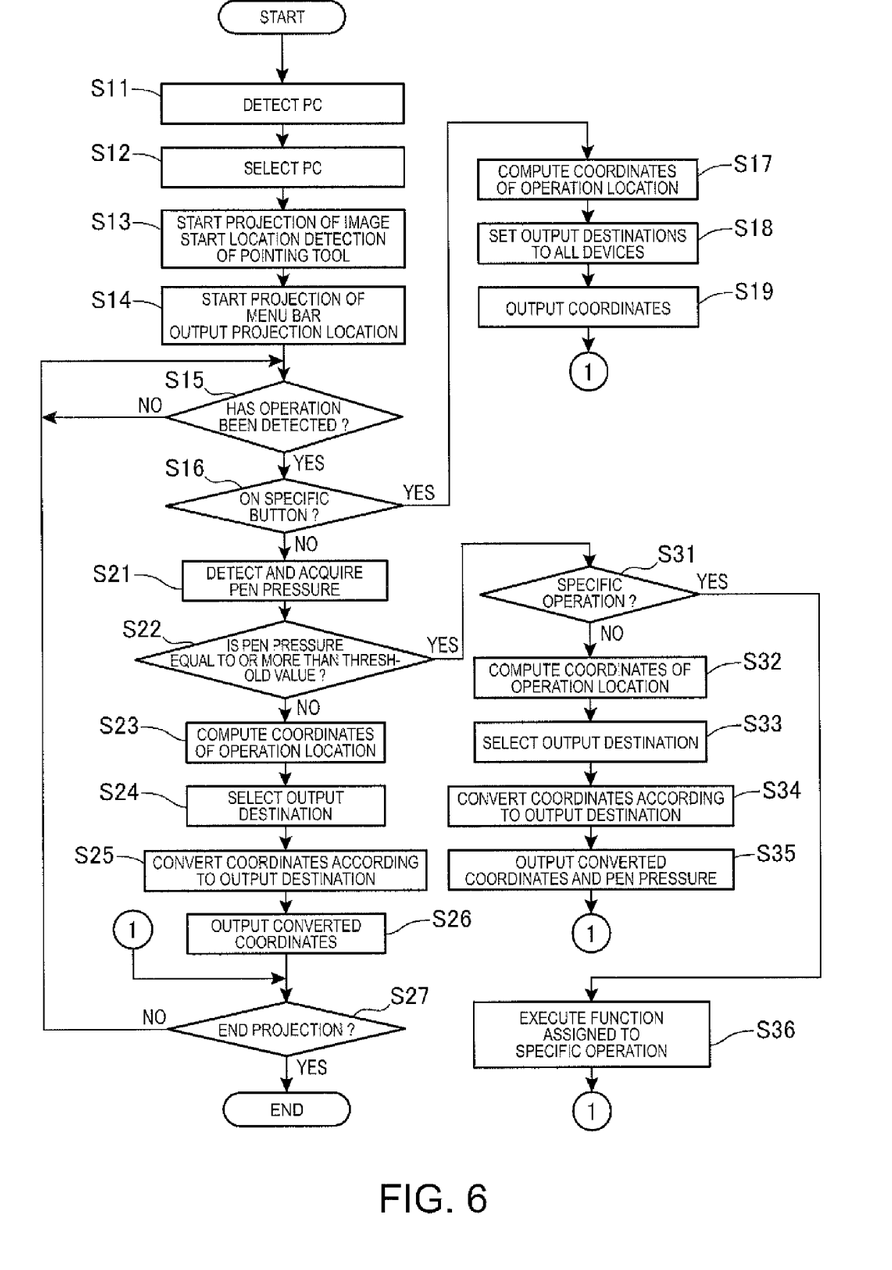
FIG. 6 is a flowchart showing an operation of the projector.

FIG. 6 is a flowchart showing an operation of a projector 11, and specifically showing a function of detecting the location pointing operation by the pointing tool 12.

The control unit 103 detects the PC 13 inputting image data to the external interface 102 (step S11), selects one or more PCs 13 among the detected. PCs 13 (step S12). Here, the control unit 103 selects the PCs 13 in the number corresponding to the number of splits (number of areas) of the projection image when executing the multi-window display function, and selects one PC 13 when executing the single window display function.

The control unit 103 projects the projection image on the screen SC based on the image data input from the selected PC 13, and starts detection of the location pointing operation by the pointing tool 12 (step S13). Further, the control unit 103 controls the image processing unit 110 to project the menu bar on the screen SC, and outputs control information showing the location of the menu bar in the projection image being projected to all PCs 13 (step S14).

The control unit 103 waits until the operation by the pointing tool 12 is detected (step S15) and, if the operation and the pointed location of the pointing tool 12 are detected by the location detection unit 150 (step S15; Yes), determines whether or not the pointed location is superimposed on a specific button on the menu bar (step S16). If the pointed location is superimposed on the specific button (step S16; Yes), the control unit 103 allows the coordinate computation part 159 to compute coordinates of the operation location (first coordinate information) (step S17), the output control unit 101 sets all PCs 13 as the output destinations of the coordinate information (step S18), the output switching unit 163 outputs the first coordinate information to the PCs 13 (step S19), and the process moves to step S27, which will be described later.

If the pointed location detected by the location detection unit 150 is not superimposed on the specific button (step S16; No) on the menu bar, the control unit 103 detects the pen pressure of the pointing tool 12 based on the infrared signal received by the infrared receiver part 45 (step S21), and determines whether or not the pen pressure is equal to or more than a predetermined threshold value (step S22). Here, if the pen pressure is less than the predetermined threshold value (step S22; No), the control unit 103 allows the coordinate computation part 159 to compute coordinates of the operation location (step S23). Then, the output control unit 101 selects the PC 13 as the output destination based on the computed coordinates (step S24), the coordinate conversion unit 160 converts the coordinates according to the selected PC 13 (step S25), and the output switching unit 163 outputs the converted coordinates to the PC 13 (step S26).

Here, the control unit 103 determines whether or not to end the projection (step S27) and, if the unit continues the projection (step S27; No), the unit returns to step S15.

If the pen pressure of the pointing tool 12 is equal to or more than the predetermined threshold value (step S22; Yes), the control unit 103 determines whether or not the manner of the operation by the pointing tool 12 corresponds to a specific operation (step S31). The specific operation refers to the operation by which the trajectory 12D of the operation location draws a specific pattern as shown in FIG. 5A to 5C, for example. If the manner of the operation does not correspond to any specific operation (step S31; No), the control unit 103 allows the coordinate computation part 159 to compute the coordinates of the operation location (step S32). The output control unit 101 selects the PC 13 as the output destination based on the computed coordinates (step S33), and the coordinate conversion unit 160 converts the coordinates according to the selected PC 13 (step S34). Then, the control unit 103 allows the output switching unit 163 to output the converted coordinates with the information showing the pen pressure of the pointing tool 12 to the PC 13 (step S35). In this case, the PC 13 receives the information of the pen pressure with the coordinates of the pointed location by the pointing tool 12, and thereby, may perform processing of changing thicknesses and colors of the lines in response to the pen pressure when a figure is drawn, for example. Then, the control unit 103 moves to step S27.

Further, if the manner of the operation by the pointing tool 12 corresponds to the specific operation (step S31; Yes), the control unit 103 executes the operation preset in correspondence with the specific operation (step S36), and moves to step S27. The operation executed at step S36 includes changing of the display locations of images in multi-window display, switching between multi-window display and single window display, etc. as shown in FIGS. 5A to 5C, for example.

As described above, the projector 11 according to the embodiment to which the invention is applied includes the projection unit 3 that displays an image on the screen SC, the control unit 103 that allows the projection unit 3 to display a plurality of images based on image data input from a plurality of PCs 13, the location detection unit 150 that detects the operation location of the operation by the pointing tool 12 with respect to the screen SC, the output control unit 101 that selects the PC 13 based on the operation location detected by the location detection unit 150 and the display location of the image on the screen SC, and the output switching unit 163 that outputs the coordinates of the operation location to the PC 13 selected by the output control unit 101, and thus, when an operation is performed with respect to the screen SC with the plurality of images displayed thereon, the coordinates are output to the PCs 13 that input the image data corresponding to the images. Thereby, for example, in the PC 13, processing including changing of the image data in response to the operation may be performed.

Further, the output control unit 101 specifies the image superimposed on the operation location detected by the location detection unit 150 on the screen SC, selects the PC 13 corresponding to the specified image, and thereby, the PC 13 that has output the image data corresponding to the image may perform processing corresponding to the operation location. Therefore, various operations may be performed in response to the operation with respect to the screen SC, and the operability may be improved.

Furthermore, the control unit 103 allows the projection unit 3 to display the menu bar 210 with the plurality of images and, if the operation location detected by the location detection unit 150 on the screen SC is superimposed on the menu bar 210, the output control unit 101 selects all PCs 13 corresponding to the images displayed by the projection unit 3. Thus, when the operation corresponding to the menu bar 210 is performed, a wider variety of operations including changing of all images, for example, may be performed using the menu bar 210.

In addition, the output switching unit 163 outputs the operation location detected by the location detection unit 150 and converted by the coordinate conversion unit 160 into the coordinates with reference to the image input by the PC 13 selected by the output control unit 101, and thereby, the operation location may be promptly specified in the PC 13 and various processing including changing of the image based on the operation location may be executed more promptly.

Moreover, the projector 11 outputs the information showing the pen pressure, for example, as the operation status of the pointing tool 12 detected by the location detection unit 150 to the PC 13 selected by the output control unit 101, and thereby, processing including changing of the image in response to the operation status may be executed in the PC 13.

Note that the above described embodiment is just an example of the specific embodiment to which the invention is applied not for limiting the invention, and the invention may be applied as an embodiment different from the above described embodiment. For example, in the above described embodiment, the coordinates of the pointed location of the pointing tool 12 detected by the location detection unit 150 are output to the PC 13, however, the invention is not limited to that. For example, new coordinates may be generated based on the detected coordinates and output to the respective PCs 13. For example, in the case where, during operation of drawing a square, a start point and an end point of areas in which the square is drawn are designated by the operation of the pointing tool 12, the control unit 103 may generate coordinates for drawing lines forming the square based on the designated start point and end point, obtain the generated coordinates with respect to each area, and output the obtained coordinates with respect to each area to the respective PCs 13 corresponding to the respective areas. In this manner, the control unit 103 may compute and output, not the coordinates of the pointed location themselves, but other coordinates obtained from the coordinates of the pointed location to the PCs 13, and thereby, drawing of a wider variety of figures or the like may be performed.

Further, in the above described embodiment, the pen pressure of the pointing tool 12 is detected, however, the pointing tool 12 may include a switch and transmit information showing an operation status of the switch as an infrared signal, and the control unit 103 may detect the operation status of the switch based on the infrared signal.

Furthermore, in the above described embodiment, the shape of the pointing tool 12 is not limited to a stick shape or a pen shape. For example, with a finger of the user as the pointing tool 12, its pointed location may be detected.

In addition, in the above described embodiment, the configuration in which the location detection unit 150 detects the pointed location by the pointing tool 12 based on the taken image data is taken as an example for explanation, however, the invention is not limited to that. For example, a pressure-sensitive or capacitance touch panel may be provided on the screen SC as the display surface or a display screen in another display system, and contact of the finger of the user, a stick member, or the like as the pointing tool 12 may be detected by the touch panel. Further, the location detection unit 150 may be formed using a separate digital camera or the like.

Moreover, the light modulator 32 may be formed by a system of combining one liquid crystal panel and a color wheel, a system using three digital mirror devices (DVD), a DMD system of combining one digital mirror device and a color wheel, or the like. Here, in the case where only one liquid crystal panel or DMD is used for the display part, a member corresponding to the combining system such as a cross dichroic prism is not necessary. Or, other configurations than the liquid crystal panel or the DMD may be employed without difficulty as long as they may modulate the light emitted by the light source.

Furthermore, the display device of the invention is not limited to the projector that projects an image on the screen SC, but the display device of the invention includes various display devices such as self-emitting display devices including a liquid crystal monitor or a liquid crystal television that displays an image on a liquid crystal display panel or a monitor device or a television receiver that displays an image on a PDP (plasma display panel), and a monitor device or a television receiver that displays an image on an organic EL display panel called OLED (Organic light-emitting diode), OEL (Organic Electro-Luminescence), or the like. In this case, the liquid crystal display panel, the plasma display panel, the organic EL display panel correspond to the display means, and their display screens correspond to the display surface.

Moreover, the respective functional units of the projector 11 shown in FIG. 2 and the respective functional units of the PC 13 shown in FIG. 3 show the functional configuration realized by cooperation of hardware and software, and their specific mounting configurations are not particularly limited. Further, the projector 11 may download and execute the control program 105A that has been stored in the memory unit 105 in the embodiment from another device connected via the communication network, or the control program 105A may be recorded in a portable memory medium and the respective programs may be read from the memory medium and executed. In addition, changes may be arbitrarily made to the specific detailed configurations of the other respective parts of the projection system 1 without departing from the scope of the invention.

What is claimed is:

1. A display device comprising:
   a display unit that displays an image on a display surface;
   a display control unit that allows the display unit to display a plurality of images based on image data input from a plurality of image supply devices;
   a detection unit that detects a single operation location of a single operation by a pointing tool with respect to the display surface;
   an output control unit that selects at least one of the image supply devices based on the operation location detected by the detection unit and a display location of the image on the display surface; and
   an output switching unit that transmits the detected operation location to the selected at least one of the image supply devices, wherein
   the display control unit determines whether the detected operation location of the pointing tool is superimposed on a specific button,
   the output control unit selects all of the image supply devices and the output switching unit transmits the detected operation location to all of the image supply devices in response to a single determination that the detected operation location is superimposed on the specific button to thereby select the specific button, and
   the output control unit selects one of the image supply devices and the output switching unit transmits the detected operation location to the selected one of the image supply devices in response to a single determination that the detected operation location is not superimposed on the specific button to thereby not select the specific button.

2. The display device according to claim 1, wherein
   the output control unit detects an image superimposed on the operation location detected by the detection unit on the display surface and selects the image supply device corresponding to the specified image.

3. The display device according to claim 1, wherein
   the display control unit allows the display unit to display an operation image with the plurality of images, and
   the output control unit selects all of the image supply devices corresponding to the images displayed by the display unit when the operation location detected by the detection unit is superimposed on the operation image on the display surface.

4. The display device according to claim 1, wherein
   the output switching unit transmits the operation location detected by the detection unit as coordinates with reference to the image input by the image supply device selected by the output control unit.

5. The display device according to claim 1, wherein the display control unit selects at least a plurality of image supply devices among the plurality of image supply devices, and allows the display unit to display the plurality of images based on the image data input from the selected plurality of image supply devices.

6. The display device according to claim 1, wherein the detection unit detects an operation status of the pointing tool with the operation location by the pointing tool, and the output control unit controls transmission of the operation location by the output switching unit and/or execution of other processing based on the operation status of the pointing tool detected by the detection unit.

7. The display device according to claim 6, wherein the output control unit selects the image supply device based on the operation status of the pointing tool detected by the detection unit, and the output switching unit transmits information showing the operation status of the pointing tool detected by the detection unit to the image supply device selected by the output control unit.

8. A method of controlling a display device including a display unit that displays an image on a display surface, comprising:
    displaying a plurality of images based on image data input from a plurality of image supply devices;
    detecting a single operation location of a single operation by a pointing tool with respect to the display surface;
    determining whether the detected operation location of the pointing tool is superimposed on a specific button;
    selecting all of the image supply devices as an output destination of the detected operation location and transmitting the detected operation location to all of the image supply devices in responses to a single determination that the detected operation location is superimposed on the specific button to thereby select the specific button; and
    selecting one of the image supply devices as the output destination of the detected operation location based on the detected operation location and a display location of the image on the display surface and transmitting the detected operation location to the selected one of the image supply devices in response to a single determination that the detected operation location is not superimposed on the specific button to thereby not select the specific button.

9. The display device according to claim 1, further comprising
    an image processing unit that superimposes an operation image on the plurality of images, the operation image including a plurality of selectable buttons which includes the specific button, each of the buttons having a different assigned function, and when coordinates of the operation location correspond to a position of one of the plurality of selectable buttons, the output switching unit transmits the operation location to all of the image supply devices.

10. The method according to claim 8, further comprising superimposing an operation image on the plurality of images, the operation image including a plurality of selectable buttons which includes the specific button, each of the buttons having a different assigned function, further comprising transmitting the operation location to all of the image supply devices when coordinates of the operation location correspond to a position of one of the plurality of selectable buttons.

* * * * *